(12) United States Patent
Osanai et al.

(10) Patent No.: US 8,994,963 B2
(45) Date of Patent: Mar. 31, 2015

(54) SHEET CONVEYANCE UNIT, IMAGE READING DEVICE, AND IMAGE FORMING APPARATUS

(71) Applicants: Yohei Osanai, Kanagawa (JP); Yasunobu Youda, Kanagawa (JP); Taku Kudoh, Kanagawa (JP); Takayuki Andoh, Kanagawa (JP); Koji Hatayama, Kanagawa (JP)

(72) Inventors: Yohei Osanai, Kanagawa (JP); Yasunobu Youda, Kanagawa (JP); Taku Kudoh, Kanagawa (JP); Takayuki Andoh, Kanagawa (JP); Koji Hatayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/751,260

(22) Filed: Jan. 28, 2013

(65) Prior Publication Data

US 2013/0222826 A1 Aug. 29, 2013

(30) Foreign Application Priority Data

Feb. 23, 2012 (JP) ................................. 2012-037872

(51) Int. Cl.
*G06K 15/00* (2006.01)
*B65H 3/00* (2006.01)
*B65H 3/52* (2006.01)
*H04N 1/04* (2006.01)
*H04N 1/00* (2006.01)
*G03G 15/00* (2006.01)
*B65H 3/06* (2006.01)

(52) U.S. Cl.
CPC ......... *H04N 1/00628* (2013.01); *G03G 15/602* (2013.01); *B65H 3/0684* (2013.01); *B65H 3/5223* (2013.01); *H04N 1/0062* (2013.01); *G03G 2215/00189* (2013.01); *H04N 2201/0091* (2013.01); *B65H 2405/1112* (2013.01); *B65H 2801/06* (2013.01)
USPC ............. 358/1.12; 271/18; 271/121; 358/498

(58) Field of Classification Search
None
See application file for complete search history.

(56) References Cited

U.S. PATENT DOCUMENTS

| 4,662,765 | A  | * | 5/1987 | Kapp et al. ...................... 400/595 |
|---|---|---|---|---|
| 6,390,463 | B1 | * | 5/2002 | Iwago ............................ 271/118 |
| 7,597,316 | B2 | * | 10/2009 | Nakahata et al. .............. 271/152 |
| 8,322,710 | B2 | * | 12/2012 | Andoh et al. .................. 271/145 |
| 2003/0155702 | A1 | * | 8/2003 | Togashi et al. ................. 271/121 |
| 2006/0180991 | A1 | * | 8/2006 | Nakahata et al. .............. 271/121 |
| 2011/0285078 | A1 | * | 11/2011 | Andoh et al. ............. 271/265.01 |
| 2012/0104676 | A1 | * | 5/2012 | Hatayama et al. .............. 271/3.2 |

FOREIGN PATENT DOCUMENTS

JP 11-130287 5/1999

* cited by examiner

*Primary Examiner* — Marcus T Riley
(74) *Attorney, Agent, or Firm* — Harness, Dickey & Pierce P.L.C.

(57) ABSTRACT

A sheet conveyance unit including a sheet tray on which a stack of sheets is placed, a sheet feed member to feed sheets from the stack of sheets, a separation/feed unit to separate a topmost sheet from the rest of sheets fed by the sheet feed member and feed the topmost sheet to a predetermined position, and a pre-separation unit disposed between the sheet tray and the separation/feed unit. The pre-separation unit includes a downward sloped portion to guide a leading edge of each sheet diagonally downward, and an upward sloped portion provided downstream from the downward sloped portion in a conveyance direction of the sheets to guide the leading edge of each sheet diagonally upward. Both ends of the upward sloped portion in a lateral direction are sloped upward more gently than the center of the upward sloped portion.

8 Claims, 11 Drawing Sheets

SHEET CONVEYANCE UNIT, IMAGE READING DEVICE, AND IMAGE FORMING APPARATUS

CROSS-REFERENCE TO RELATED APPLICATION

This patent application is based on and claims priority pursuant to 35 U.S.C. §119 to Japanese Patent Application No. 2012-037872, filed on Feb. 23, 2012, in the Japan Patent Office, the entire disclosure of which is hereby incorporated by reference herein.

BACKGROUND OF THE INVENTION

1. Field of the Invention

Exemplary aspects of the present invention generally relate to a sheet conveyance unit that separates sheets of paper placed on a sheet tray one by one to feed each sheet separately from the sheet tray, an image reading device including the sheet conveyance unit, and an image forming apparatus including the image reading device.

2. Description of the Related Art

Related-art image forming apparatuses, such as copiers, printers, facsimile machines, and multifunction devices having two or more of copying, printing, and facsimile functions, typically form a toner image on a recording medium (e.g., a sheet of paper, etc.) according to image data using an electrophotographic method. In such a method, for example, a charger charges a surface of an image bearing member (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor onto a sheet of recording media; and a fixing device applies heat and pressure to the sheet bearing the toner image to fix the toner image onto the sheet. The sheet bearing the fixed toner image is then discharged from the image forming apparatus.

An image reading device such as a scanner used for the image forming apparatus often employs a sheet-through method, in which an image on a sheet of an original document is read by an image reading unit fixed to the image reading device while the document is conveyed past the device at a predetermined speed. Because the image on the document is read while the document is being conveyed, the image reading device employing the sheet-through method can achieve higher productivity compared, for example, to a book-type image reading device, in which conveyance of the document is temporarily stopped while irradiating the document with light to read the image on the document.

The image reading device employing the sheet-through method includes an automatic document conveyance unit that conveys sheets of documents one by one from a document stand, on which the documents are placed, to an image reading position, at which the image reading unit reads images on the documents. During continuous reading of the images on the documents, the automatic document conveyance unit is required to prevent multiple feeding of documents to the image reading position.

Known image reading devices include a document conveyance unit that conveys the document to the image reading position and a pickup roller that picks up a topmost document from a stack of multiple documents placed on the document stand to feed the topmost document to the document conveyance unit. The pickup roller contacts an upper surface of the topmost document on the document stand at a predetermined position in a direction of conveyance of the documents and is rotatively driven to feed the topmost document to the document conveyance unit. The image reading device further includes a separation unit that separates the topmost document fed by the pickup roller from the rest of the documents so that only the topmost document is conveyed to the document conveyance unit. As a result, multiple feeding of the documents can be prevented.

However, when multiple documents closely contacting each other reach the separation unit together at the same time, those documents cannot be separated from each other by the separation unit, causing multiple feeding of the documents to the document conveyance unit. To solve this problem, a configuration that includes a pre-separation unit disposed between the pickup roller and the separation unit is used. The pre-separation unit includes a guide member that guides the documents to the separation unit. The guide member has a sloped surface sloping upward from upstream to downstream in the conveyance direction of the documents so that resistance against the conveyance direction of the documents is applied to the documents passing over the sloped surface of the pre-separation unit. Accordingly, only the topmost document to which a conveyance force is directly applied by the pickup roller is conveyed to the separation unit against the resistance applied by the sloped surface of the pre-separation unit. By contrast, the rest of the documents, which reach the sloped surface of the pre-separation unit together with the topmost document, are separated from the topmost document by the resistance applied by the sloped surface of the pre-separation unit.

Thus, provision of the pre-separation unit can more securely prevent multiple feeding of the documents. However, in a case in which the documents conveyed to the pre-separation unit are skewed, the skew of the documents may be increased by the pre-separation unit because one of lateral corners at a leading edge of each document in the conveyance direction, which is perpendicular to the lateral direction of the documents, is positioned upstream from the other one of lateral corners thereof and receives resistance from the sloped surface of the pre-separation unit. As a result, a torque that rotates the one of the lateral corners of the document toward the upstream of the conveyance direction around a contact position, at which the document is contacted by the pickup roller, is generated. Consequently, the skew of the document is further increased.

The increase in the skew of the documents may occur also in a case in which the surface of the pre-separation unit is not sloped upward. For example, even when the surface of the pre-separation unit is horizontally formed or sloped downward, the skew of the documents may be increased as long as an angle formed between the downward sloped surface and a guide portion provided immediately in front of the downward sloped surface or, in a case in which the guide portion is not provided, along the surface of a plane at the leading edge of the document immediately in front of the downward sloped surface (hereinafter referred to as plane surface direction) is less than 180°.

In addition, even in a configuration in which both the sloped surface and the plane surface direction are upward from a conveyance path of the documents, the skew of the documents may be increased when the angle between the sloped surface and the plane surface direction is less than 180°. This happens because even after the leading edge of the document is guided in the plane surface direction, the document tends to keep its shape along the conveyance direction while being conveyed in the plane surface direction due to its stiffness. At this time, when the angle between the plane surface direction and the sloped surface is less than 180°, the leading edge of the document conveyed in the plane surface direction hits against the sloped surface so that the resistance against the conveyance direction is applied to the document.

Thus, although the topmost document is separated from the rest of the documents by the resistance, the skew of the document is increased when the resistance acts only on the one of the lateral corners at the leading edge of each document.

SUMMARY OF THE INVENTION

In view of the foregoing, embodiments of the present invention provide a novel sheet conveyance unit that achieves good separation performance using a pre-separation unit and prevents skew of a sheet passing over a sloped portion of the pre-separation unit, an image reading device including the sheet conveyance unit, and an image forming apparatus including the image reading device.

In one illustrative embodiment, a sheet conveyance unit includes a sheet tray on which a stack of sheets is placed, a sheet feed member to feed sheets from the stack of sheets placed on the sheet tray, a separation/feed unit to separate a topmost sheet from the rest of sheets fed by the sheet feed member and feed the topmost sheet to a predetermined position, and a pre-separation unit disposed between the sheet tray and the separation/feed unit. The pre-separation unit includes a downward sloped portion to guide a leading edge of each sheet fed by the sheet feed member diagonally downward, and an upward sloped portion continuous with the downward sloped portion and provided downstream from the downward sloped portion in a conveyance direction of the sheets to guide the leading edge of each sheet diagonally upward. Both ends of the upward sloped portion in a lateral direction perpendicular to the conveyance direction of the sheets are sloped upward more gently than the center of the upward sloped portion in the lateral direction.

In another illustrative embodiment, an image reading device includes the sheet conveyance unit described above and a reading unit to read images on the sheets conveyed by the sheet conveyance unit.

In yet another illustrative embodiment, an image forming apparatus includes the image reading device described above and an image forming unit to form an image based on image data read by the image reading device.

Additional features and advantages of the present disclosure will become more fully apparent from the following detailed description of illustrative embodiments, the accompanying drawings, and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF THE INVENTION

Figure 1:
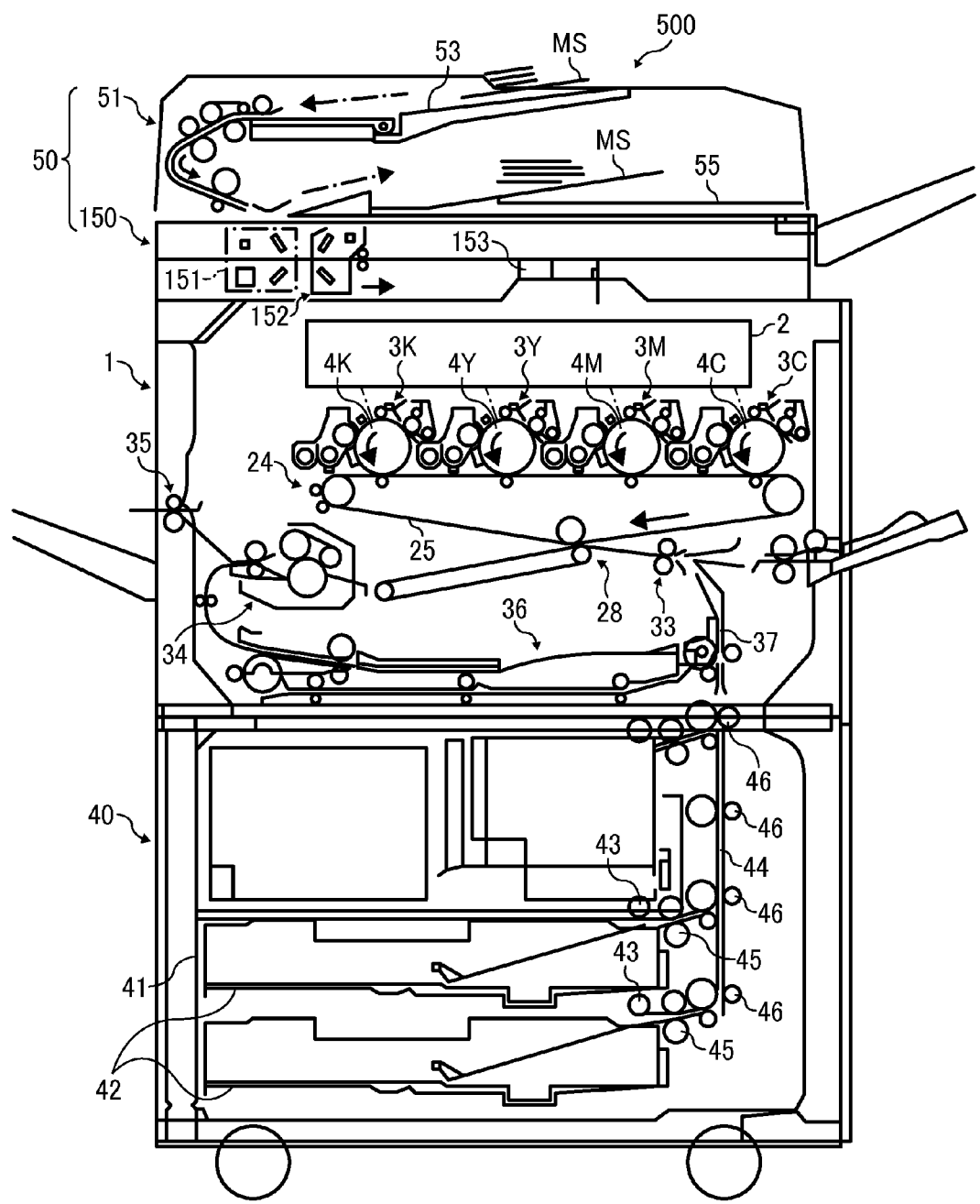
FIG. 1 is a vertical cross-sectional view illustrating an example of a configuration of an image forming apparatus according to an illustrative embodiment.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings. In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

A description is now given of a basic configuration of an image forming apparatus 500 according to an illustrative embodiment with reference to FIG. 1.

FIG. 1 is a vertical cross-sectional view illustrating an example of a configuration of the image forming apparatus 500. It is to be noted that, in the present illustrative embodiment, the image forming apparatus 500 is a copier employing an electrophotographic method.

The image forming apparatus 500 includes an image forming unit 1, a sheet feeder 40, and an image reading device 50. The image reading device 50 includes a reading unit, which, in the present illustrative embodiment, is a scanner unit 150 fixed above the image forming unit 1, and a sheet conveyance unit, which, in the present illustrative embodiment, is an automatic document feeder (ADF) 51 supported by the scanner unit 150.

The sheet feeder 40 includes a paper bank 41, sheet feed cassettes 42 disposed one above the other within the paper bank 41, sheet feed rollers 43, each of which feeds sheets from the corresponding sheet feed cassette 42, and separation rollers 45, each of which separates the sheets fed by the corresponding sheet feed roller 43 one by one to convey each sheet to a sheet feed path 44. The sheet feeder 40 further includes multiple conveyance rollers 46 that convey the sheets to a sheet feed path 37 formed in the image forming unit 1. The sheet is fed from one of the sheet feed cassettes 42 to the sheet feed path 37 of the image forming unit 1 by the sheet feed roller 43, the multiple conveyance rollers 46, and so forth.

Figure 2:
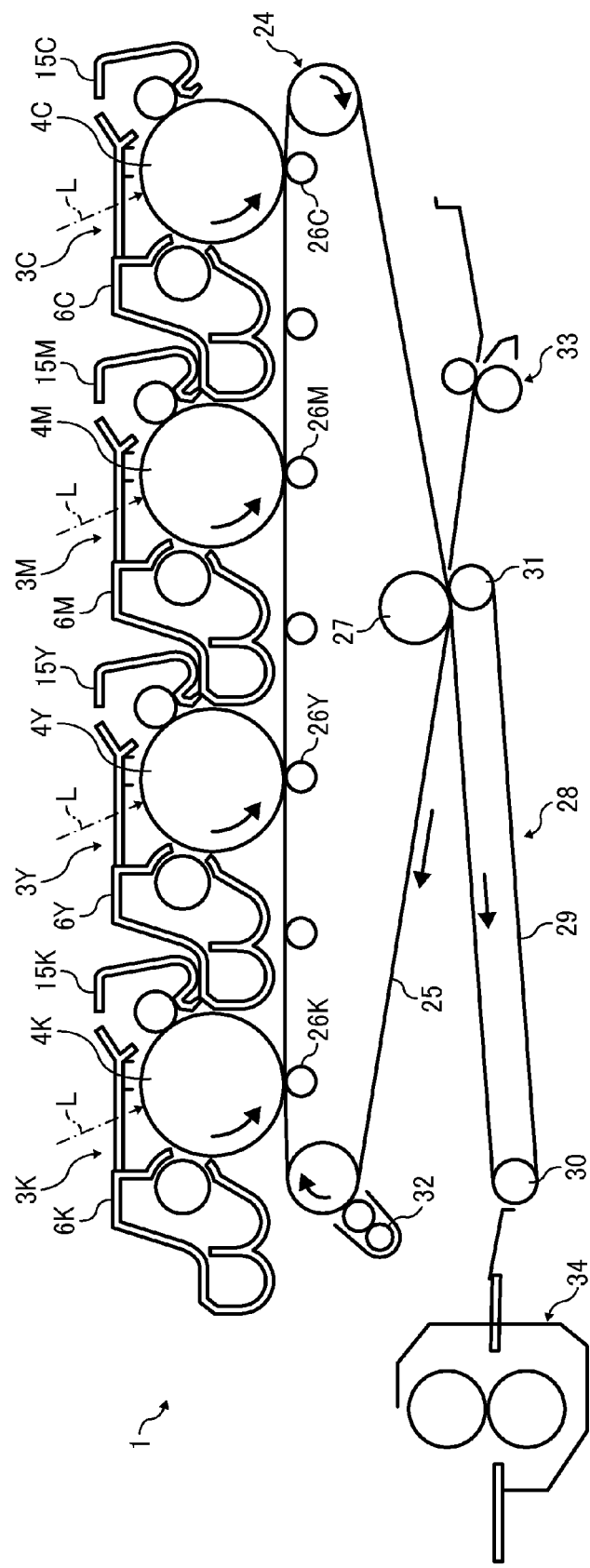
FIG. 2 is an enlarged view illustrating an example of a configuration of an image forming unit of the image forming apparatus illustrated in FIG. 1.

FIG. 2 is an enlarged view illustrating an example of a configuration of the image forming unit 1. Referring both FIGS. 1 and 2, the image forming unit 1 includes an optical writing device 2, process units 3K, 3Y, 3M, and 3C (hereinafter collectively referred to as process units 3), each of which forms a toner image of a specific color, that is, black (K), yellow (Y), magenta (M), or cyan (C), a transfer unit 24, a conveyance unit 28, a pair of registration rollers 33, a fixing unit 34, a reverse unit 36, and the sheet feed path 37. During image formation, a light source such as a laser diode or an LED, not shown, disposed within the optical writing device 2 is driven to irradiate drum-type photoconductors 4K, 4Y, 4M, and 4C (hereinafter collectively referred to as photoconductors 4) provided to the process units 3 with light L, respectively. Accordingly, electrostatic latent images of the specified colors are formed on the photoconductors 4, respectively. The electrostatic latent images are then developed with toner of the specified colors so that toner images of the specified colors are formed on the photoconductors 4, respectively.

Each of the photoconductors 4 and components provided around the corresponding photoconductor 4 are formed together as a single integrated process unit 3, and each process unit 3 is detachably installable in the image forming unit 1. For example, the process unit 3K that forms a black toner image includes the photoconductor 4K, a developing device 6K that develops the electrostatic latent image formed on the photoconductor 4K with black toner to form a black toner image on the photoconductor 4K, and a cleaning device 15K that removes untransferred black toner remaining on the photoconductor 4K from the photoconductor 4K after the black toner image has passed through a primary transfer nip described in detail later. The image forming apparatus 500 has a tandem-type configuration in which the process units 3 are disposed opposite an intermediate transfer belt 25 side by side along a direction of rotation of the intermediate transfer belt 25.

Figure 3:
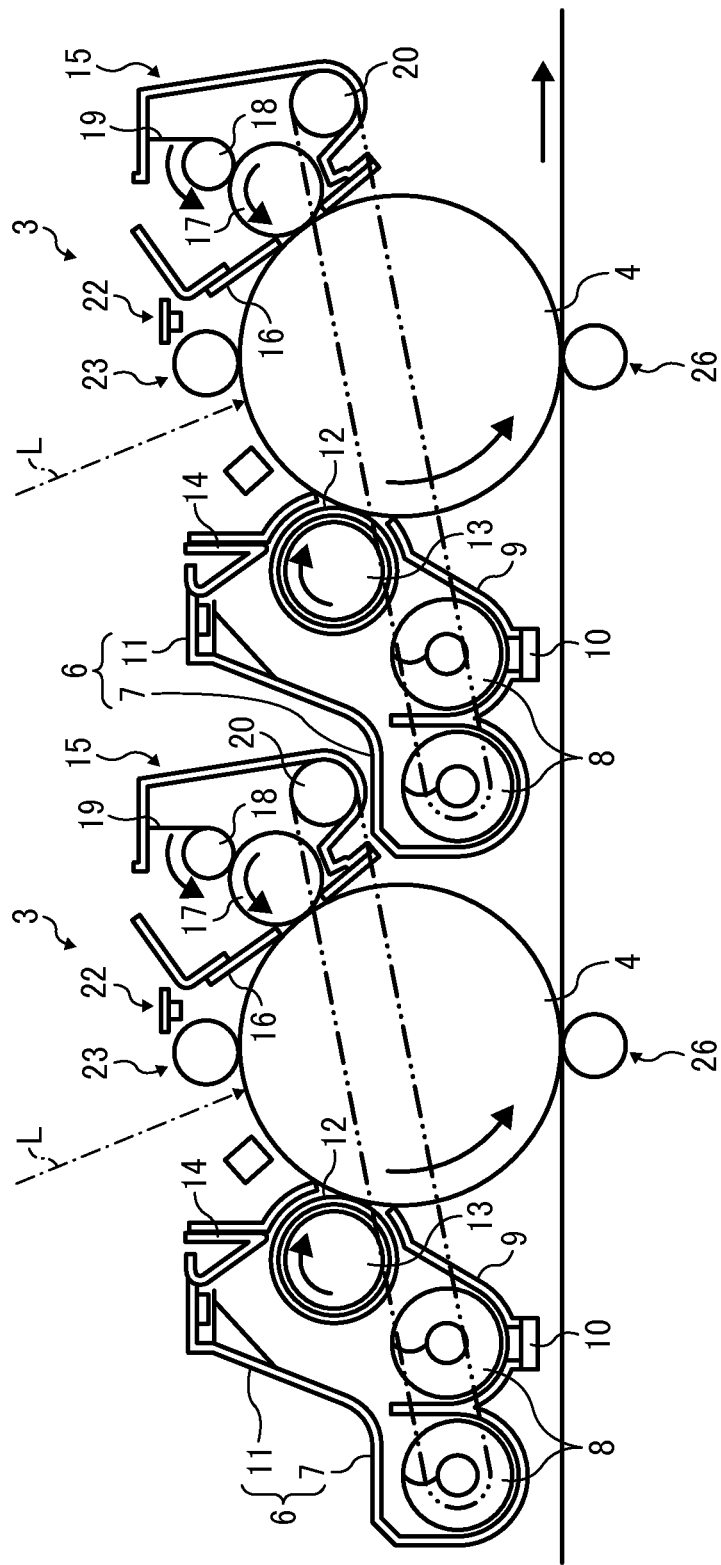
FIG. 3 is a partial enlarged view illustrating a tandem-type configuration of the image forming apparatus.

FIG. 3 is a partial enlarged view illustrating the tandem-type configuration of the image forming apparatus 500. It is to be noted that each of the process units 3 has the same basic configuration, differing only in the color of toner used. Therefore, suffixes K, Y, M, and C, each representing the color of toner, are hereinafter omitted. In each of the process units 3, a charger 23, a developing device 6, a cleaning device 15, and a neutralizing lamp 22 are provided around the photoconductor 4.

Each of the photoconductors 4 includes an aluminum pipe coated with an organic photosensitive material so that a photosensitive layer is formed on the pipe. Alternatively, a seamless belt may be used for the photoconductors 4.

The developing devices 6 use two-component developer including magnetic carrier and non-magnetic toner to develop the electrostatic latent images with the toner, respectively. Each of the developing devices 6 includes a developing sleeve 12, an agitator part 7 that conveys the two-component developer to the developing sleeve 12 while agitating the two-component developer, and a developing part 11 that transfers the toner of the two-component developer borne by the developing sleeve 12 onto the photoconductor 4.

The agitator part 7 is disposed below the developing part 11 and includes two conveyance screws 8 provided parallel to each other, a partition wall provided between the two conveyance screws 8, and a toner density sensor 10 provided to a bottom surface of a developing casing 9 of the developing device 6.

The developing part 11 includes the developing sleeve 12 provided opposite the photoconductor 4 via an opening formed in the developing casing 9, a magnet roller 13 immovably provided within the developing sleeve 12, and a doctor blade 14, a leading edge of which is provided close to the developing sleeve 12. The developing sleeve 12 is constructed of a rotatable non-magnetic cylinder. The magnet roller 13 has multiple magnetic poles sequentially arrayed in a direction of rotation of the developing sleeve 12 from a position opposite the doctor blade 14. Magnetic forces of the multiple magnetic poles act on the two-component developer borne on the developing sleeve 12 at a predetermined position in the direction of rotation of the developing sleeve 12. As a result, the two-component developer conveyed from the agitator part 7 is attracted and borne by the developing sleeve 12 so that a magnetic brush is formed on the developing sleeve 12 along a magnetic line of force.

A thickness of the magnetic brush is appropriately restricted when the magnetic brush passes through the doctor blade 14 as the developing sleeve 12 rotates. Thereafter, the magnetic brush is conveyed to a developing range opposite the photoconductor 4. A potential difference between a developing bias applied to the developing sleeve 12 and the electrostatic latent image formed on the photoconductor 4 transfers the toner from the developing sleeve 12 onto the electrostatic latent image. As a result, the electrostatic latent image is developed with the toner. The two-component developer remaining on the developing sleeve 12 after transfer of the toner onto the electrostatic latent image is returned to the developing part 11 as the developing sleeve 12 further rotates. In the developing part 11, the two-component developer forming the magnetic brush is removed from the developing sleeve 12 by a repulsive magnetic field formed between the magnetic poles of the magnet roller 13 and then is returned to the agitator part 7. An appropriate amount of toner is supplied to the two-component developer in the agitator part 7 based on a result detected by the toner density sensor 10. It is to be noted that, in place of the two-component developer, the developing devices 6 may use single-component developer without magnetic carrier.

Each of the cleaning device 15 includes a cleaning blade 16 that is formed of polyurethane rubber and is pressed against the photoconductor 4. Alternatively, the cleaning device 15 may have a different configuration. In order to improve cleaning performance, an outer circumferential surface of the photoconductor 4 is contacted by a contact-type conductive fur brush 17 provided to the cleaning device 15. The fur brush 17 collects waste toner from the photoconductor 4 while rotating in a counterclockwise direction in FIG. 3, and also functions as a lubricant applicator that scratches fine powder lubricant off from a solid 3 5 lubricant, not shown, to apply the fine powder lubricant to the surface of the photoconductor 4. A metal electric field roller 18 rotatable in the counterclockwise direction in FIG. 3 to apply a bias to the fur brush 17 is also provided to the cleaning device 15. The electric field roller 18 is contacted by a leading edge of a scraper 19. Waste toner collected by the fur brush 17 is moved to the electric field roller 18 to which the bias is applied while contacting the fur brush 17 and rotating against the direction of rotation of the fur brush 17. Thereafter, the waste toner is scraped off from the electric field roller 18 by the scraper 19 and falls down on a collection screw 20. The collection screw 20 conveys the waste toner to an end of the cleaning device 15 in a direction perpendicular to the plane of FIG. 3 so that the waste toner is collected to a recycle conveyance device provided outside the cleaning device 15. The recycle conveyance device returns the waste toner to the developing part 11 of the developing device 6 so that the toner is reused.

The neutralizing lamp 22 irradiates the photoconductor 4 with light to neutralize the photoconductor 4. The photoconductor 4 thus neutralized is then evenly charged by the charger 23. Thereafter, the optical writing device 2 irradiates the photoconductor 4 with the light L to form an electrostatic latent image on the photoconductor 4. In the present illustrative embodiment, the charger 23 includes a charging roller to which a charging bias is applied while contacting the photoconductor 4. Alternatively, a scorotron charger or the like that charges the photoconductor 4 without contacting the photoconductor 4 may be used as the charger 23.

A series of the above-described processes is performed by each of the process units 3 so that toner images of the specified colors are formed on the photoconductors 4K, 4Y, 4M, and 4C, respectively.

Returning to FIG. 1, the transfer unit 24 is disposed below the process units 3 in the image forming unit 1. In the transfer unit 24, the intermediate transfer belt 25 wound around multiple rollers is rotated in a clockwise direction in FIG. 1 while contacting each of the photoconductors 4K, 4Y, 4M, and 4C. Accordingly, primary transfer nips are formed at positions where the intermediate transfer belt 25 contacts each of the photoconductors 4. As illustrated in FIG. 2, primary transfer rollers 26K, 26Y, 26M, and 26C (hereinafter collectively referred to as primary transfer rollers 26) provided inside the loop of the intermediate transfer belt 25 press the intermediate transfer belt 25 against the photoconductors 4 at portions near the primary transfer nips, respectively.

A primary transfer bias having a polarity opposite a polarity of toner is applied by a power source, not shown, to each of the primary transfer rollers 26. Thus, a primary transfer electric field is formed at each of the primary transfer nips so that the toner images formed on the respective photoconductors 4 are electrostatically moved to the intermediate transfer belt 25 at the primary transfer nips, respectively.

Accordingly, the toner images of the specified colors are sequentially superimposed one atop the other on the intermediate transfer belt 25 as the intermediate transfer belt 25 rotates in the clockwise direction in FIGS. 1 and 2 to form a single full-color toner image on the intermediate transfer belt 25.

The conveyance unit 28 including a conveyance belt 29 wound around a drive roller 30 and a secondary transfer roller 31 to be rotated in the counterclockwise direction in FIGS. 1 and 2 is disposed below the transfer unit 24 in the image forming unit 1. Both the intermediate transfer belt 25 and the conveyance belt 29 are sandwiched between the secondary transfer roller 31 of the conveyance unit 28 and an extension roller 27 of the transfer unit 24. Accordingly, a secondary transfer nip is formed at a position where the intermediate transfer belt 25 contacts the conveyance belt 29. A secondary transfer bias is applied by a power source, not shown, to the secondary transfer roller 31. Meanwhile, the extension roller 27 of the transfer unit 24 is grounded. As a result, a secondary transfer electric field is formed at the secondary transfer nip.

The pair of registration rollers 33 disposed on the right of the secondary transfer nip in FIGS. 1 and 2 conveys the sheet to the secondary transfer nip in synchronization with the full-color toner image formed on the intermediate transfer belt 25. At the secondary transfer nip, the full-color toner image is secondarily transferred from the intermediate transfer belt 25 onto the sheet by the secondary transfer electric field and pressure so that a full-color image is formed on the sheet. The sheet having the full-color image thereon is then separated from the intermediate transfer belt 25 and is held by the conveyance belt 29 to be conveyed to the fixing unit 34.

Residual toner, which is not transferred onto the sheet at the secondary transfer nip, remains on the intermediate transfer belt 25 after passing through the secondary transfer nip. A belt cleaning device 32 that contacts the intermediate transfer belt 25 removes the residual toner from the intermediate transfer belt 25.

In the fixing unit 34, heat and pressure are applied to the sheet so that the full-color image is fixed to the sheet. The sheet having the image thereon is then conveyed to a pair of discharge rollers 35. The pair of discharge rollers 35 discharges the sheet to a discharge tray provided outside the image forming apparatus 500.

The reverse unit 36 is disposed below the conveyance unit 28 and the fixing device 34 in the image forming unit 1. In a case of duplex image formation, a direction of conveyance of the sheet having the image on a front side thereof is switched by a switching pawl, not shown, so that the sheet is conveyed to the reverse unit 36. The sheet is reversed in the reverse unit 36 and then is conveyed to the secondary transfer nip again. Accordingly, an image is formed also on a back side of the sheet. The sheet having the images on both sides thereof is then discharged to the discharge tray.

A description is now given of a configuration of the image reading device 50 fixed above the image forming unit 1.

Figure 4:
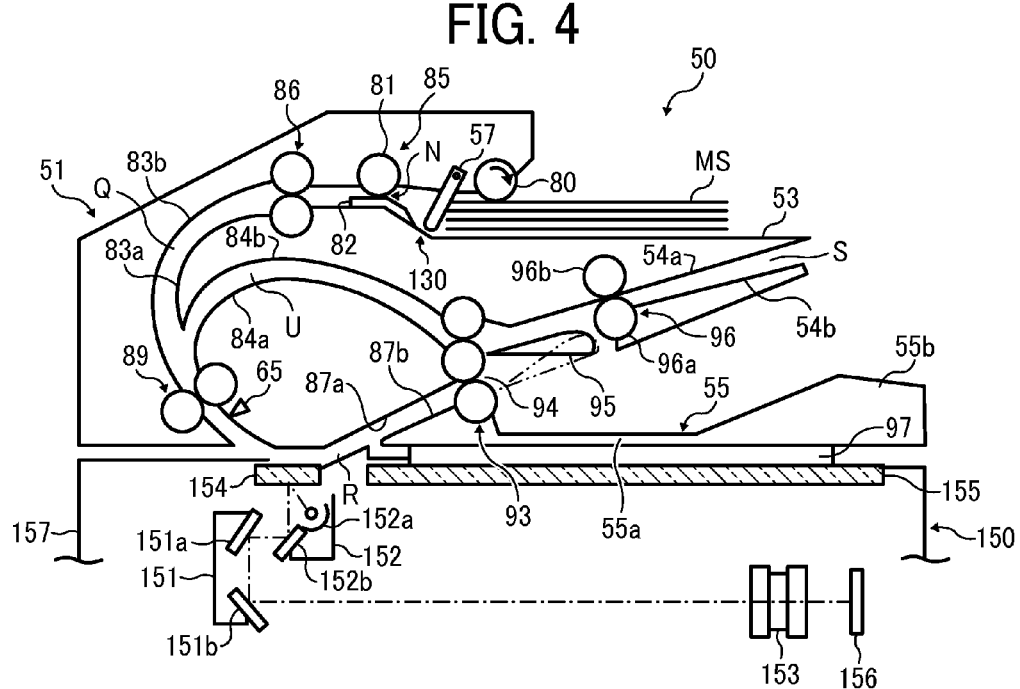
FIG. 4 is a vertical cross-sectional view illustrating an example of a configuration of an image reading device included in the image forming apparatus.
Figure 5:
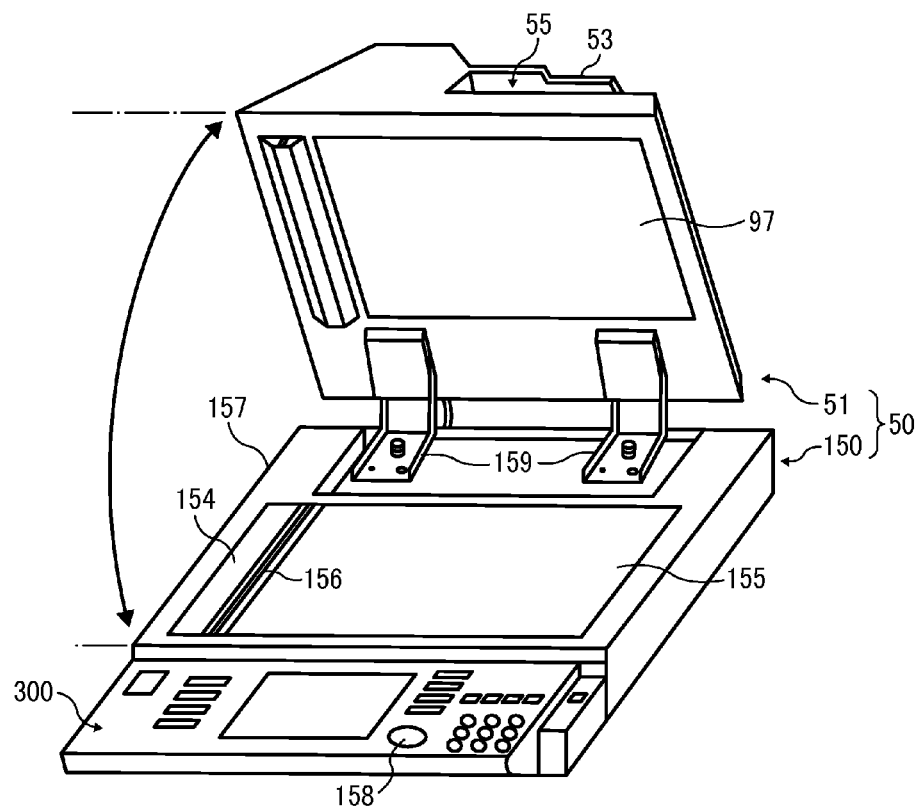
FIG. 5 is a perspective view illustrating the configuration of the image reading device.

FIG. 4 is a vertical cross-sectional view illustrating an example of a configuration of the image reading device 50. FIG. 5 is a perspective view illustrating the configuration of the image reading device 50.

The image reading device 50 includes the scanner unit 150 and the ADF 51. As illustrated in FIG. 5, the ADF 51 is hinged to allow an upper portion of the scanner unit 150 to be opened and closed.

The scanner unit 150 includes a casing 157 and first and second contact glasses 154 and 155, both provided on an upper surface of the casing 157. A light source 152a, a first carriage 152 having a first minor 152b, a second carriage 151 having second and third mirrors 151a and 151b, a fixed lens 153, and a CCD 156 are provided within the scanner unit 150. Both the first and second carriages 152 and 151 are provided movable parallel to the second contact glass 155. The second carriage 151 is configured to move at half of speed of the first carriage 152. During a waiting mode, the first carriage 152 is stopped at a home position opposite the first contact glass 154.

The ADF 51 disposed above the scanner unit 150 includes a sheet tray and a sheet feed member, which, in the present illustrative embodiment, are a document tray 53 on which sheets of paper such as documents MS are placed and a pickup roller 80, respectively, a pair of discharge rollers 93, and a sheet discharge unit, which, in the present illustrative embodiment, is a discharge tray 55. The above-described components of the ADF 51 are sequentially arranged to form a document conveyance path. The documents MS are placed on the document tray 53 in the order of pages with a side having an image thereon facing up. The pickup roller 80 is at its home position apart from the document tray 53 at a predetermined interval therebetween during the waiting mode. When a document sensor 57 detects presence of the documents MS on the document tray 53 and image reading of the documents MS is instructed through an operation unit 300, the pickup roller 80 is lowered from its home position to contact an upper surface of a topmost document MS of a stack of documents MS placed on the document tray 53.

The discharge tray 55 includes a flat part 55a on which the documents MS discharged by the pair of discharge rollers 93 are stacked and a sloped part 55b that prevents slippage of the documents MS from the discharge tray 55.

The document conveyance path formed within the ADF 51 is constructed of a conveyance path Q, a discharge path R, a switchback conveyance path S, and a reverse path U.

The conveyance path Q is formed between a lower conveyance guide 83a and an upper conveyance guide 83b. The documents MS are separated one by one at a separation nip N formed between a feed roller 81 and a separation pad 82 so that each document MS is conveyed to the first contact glass 154 through the conveyance path Q.

The discharge path R is formed between an upper discharge guide 87a and a lower discharge guide 87b. The document MS passing through the first contact glass 154 is further conveyed to a discharge opening 94 through the discharge path R.

The switchback conveyance path S is positioned below the document tray 53 and above the discharge tray 55, and is formed between an upper switchback guide 54a and a lower switchback guide 54b. A switching pawl 95 is provided in the switchback conveyance path S. A conveyance direction of the document MS discharged from the discharge opening 94 is reversed in the switchback conveyance path S so that the document MS is conveyed to the reverse path U with a trailing edge of the document MS at the head.

The reverse path U is formed between an upper reverse guide 84b and a lower reverse guide 84a. The reverse path U is joined to the conveyance path Q so that the document MS reversed while passing through the reverse path U is conveyed to the conveyance path Q again.

In the present illustrative embodiment, the feed roller 81 and the separation pad 82 together form a separation/feed unit 85. The separation/feed unit 85 is configured such that a frictional force between a surface of the feed roller 81 and the document MS is larger than a frictional force between a surface of the separation pad 82 and the document MS, and the frictional force between the separation pad 82 and the document MS is larger than a frictional force between each document MS. Accordingly, in a case in which the multiple documents MS enter the separation nip N at the same time, only the topmost document MS is conveyed to the conveyance path Q by the feed roller 81 while the second and subsequent documents MS are prevented from passing through the separation nip N by the separation pad 82, thereby separating the documents MS one by one. In place of the separation pad 82, a reverse roller may be provided at the separation nip N. However, use of the separation pad 82 can further reduce production costs compared to the use of the reverse roller.

The switching pawl 95 is disposed above the discharge tray 55 and is rotated from a position indicated by the solid line to a position indicated by the broken line in FIG. 4 to guide the document MS discharged from the discharge opening 94 to the switchback conveyance path S. The switching pawl 95 is rotated to the position indicated by the solid line when the document MS is conveyed to the switchback conveyance path S so that the document MS, the conveyance direction of which is reversed in the switchback conveyance path S, is conveyed to the reverse path U with the trailing edge of the document MS at the head.

The pairs of rollers shown in FIG. 4 are driven by a single motor. A pair of reverse rollers 96 including upper and lower reverse rollers 96b and 96a has a switching unit that solely switches rotation of the pair of reverse rollers 96 between normal rotation and reverse rotation. The pair of reverse rollers 96 is normally rotated to guide the document MS to the switchback conveyance path S. Thereafter, the pair of reverse rollers 96 is reversely rotated to convey the document MS to the reverse path U.

A registration sensor 65 is provided downstream from a pair of entrance rollers 89 and upstream from the first contact glass 154 in the conveyance direction of the document MS. The registration sensor 65 detects a leading edge of the document MS conveyed by the pair of entrance rollers 89 so that the document MS is conveyed to a reading position on the first contact glass 154 at a timing to start image reading of the document MS.

In the ADF 51, a document reading reference may be positioned at one of the center and one end of the ADF 51 in the lateral direction perpendicular to the conveyance direction of the documents MS.

A white platen 97 is provided at the bottom of the discharge tray 55 with an elastic member interposed therebetween. The platen 97 presses the document MS placed on the second contact glass 155 against the second contact glass 155. The elastic member provided with the platen 97 may be formed of sponge or magic tape®. Alternatively, a bracket may be used to form a gap between the discharge tray 55 and the platen 97 to elastically hold the platen 97.

As illustrated in FIG. 5, hinges 159 are fixed to the scanner unit 150 so that the ADF 51 and the platen 97 are hinged upward and downward together. The ADF 51 is hinged upward to expose the first and second contact glasses 154 and 155 both provided to the upper surface of the scanner unit 150 outside.

The operation unit 300 having numeric keys and a display thereon is provided to a front portion of the scanner unit 150. One of a simplex image reading mode and a duplex image reading mode is set through keys provided to the operation unit 300. A start key 158 also provided to the operation unit 300 is pressed to start image reading of the documents MS.

The image reading device 50 has two types of scanning modes including a flatbed scanning mode and an ADF scanning mode. During the flatbed scanning mode, an image on the document MS is read while the document MS is placed on the second contact glass 155. By contrast, during the ADF scanning mode, an image on the document MS conveyed from the document tray 53 to the first contact glass 154 by the ADF 51 is read while the document MS is passing above the first contact glass 154. Because the document MS passes above the first contact glass 154, the image on the document MS can be read without moving the first carriage 152 from its home position.

During the flatbed scanning mode, the first carriage 152 irradiates the document MS set on the second contact glass 155 with light emitted from the light source 152a while moving from its home position to the right in FIG. 4. The light emitted from the light source 152a is reflected by the document MS. The light is further reflected by the first, second, and third mirrors 152b, 151a, and 151b and focused on the fixed lens 153 to enter the CCD 156. The focused image data that enters the CCD 156 is converted into a digital signal, and the digital signal is sent to the image forming unit 1.

During the ADF scanning mode, one of the simplex and duplex image reading modes can be selected through the operation unit 300, and operation of the ADF 51 is controlled based the selected image reading mode.

A description is now given of operation of the ADF 51 in the ADF scanning mode during the simplex image reading mode.

When the start key 158 of the operation unit 300 is pressed during the simplex image reading mode, presence of the documents MS on the document tray 53 is checked based on a detection signal sent from the document sensor 57. When the presence of the documents MS on the document tray 53 is detected, a motor, not shown, is normally rotated so that the pickup roller 80 is lowered from its home position to contact the topmost document MS of the stack of documents MS placed on the document tray 53. Next, the pickup roller 80 is rotated in the clockwise direction in FIG. 4 to feed the documents MS from the document tray 53.

The documents MS fed by the pickup roller 80 are conveyed to the separation nip N in which the feed roller 81 and the separation pad 82 contact with each other. At the separation nip N, the documents MS are separated one by one by the feed roller 81 and the separation pad 82 so that each document MS is conveyed to the conveyance path Q.

The document MS conveyed to the conveyance path Q is further conveyed by a pair of conveyance rollers 86 to a nip formed between the pair of entrance rollers 89.

After passing between the pair of entrance rollers 89, the leading edge of the document MS passes below the registration sensor 65. A timing to start image reading is determined when the registration sensor 65 detects the leading edge of the document MS. Thus, image reading of the document MS is started at a timing when the leading edge of the document MS reaches the reading position on the first contact glass 154. Thereafter, a timing to complete image reading of the document MS is determined when the registration sensor 65 detects a trailing edge of the document MS. Thus, image reading is completed at a timing when the trailing edge of the document MS passes the reading position on the first contact glass 154.

The switching pawl 95 is constantly positioned at the position indicated by the solid line in FIG. 4 during the simplex image reading mode. Therefore, after image reading on the first contact glass 154, the document MS is discharged from the discharge opening 94 by the pair of discharge rollers 93 and is stacked on the discharge tray 55 with a side having the image thereon facing down. Upon completion of image reading of all the documents MS placed on the document tray 53, the motor is reversely rotated so that the pickup roller 80 is lifted to the home position.

All of the pickup roller 80, the feed roller 81, and the pair of conveyance rollers 86 are constantly rotated until image reading of all the documents MS is completed. It is to be noted that, because linear velocity of each of the rollers provided downstream from the feed roller 81 is set faster than linear velocity of the feed roller 81, the documents MS are conveyed through the conveyance path Q at predetermined intervals therebetween.

A description is now given of operation of the ADF 51 during the duplex image reading mode. When the start key 158 of the operation unit 300 is pressed during the duplex image reading mode, presence of the documents MS on the document tray 53 is checked based on a detection signal sent from the document sensor 57. When the presence of the documents MS on the document tray 53 is detected, the motor is normally rotated so that the pickup roller 80 is lowered from its home position to contact the topmost document MS of the stack of documents MS placed on the document tray 53. Next, the pickup roller 80 is rotated in the clockwise direction in FIG. 4 to feed the documents MS from the document tray 53.

The documents MS fed by the pickup roller 80 are conveyed to the separation nip N in which the feed roller 81 and the separation pad 82 contact with each other. At the separation nip N, the documents MS are separated one by one by the feed roller 81 and the separation pad 82 so that each document MS is conveyed to the conveyance path Q.

The document MS conveyed to the conveyance path Q is further conveyed by the pair of conveyance rollers 86 to the nip formed between the pair of entrance rollers 89.

After passing between the pair of entrance rollers 89, the leading edge of the document MS passes below the registration sensor 65. A timing to start image reading is determined when the registration sensor 65 detects the leading edge of the document MS for the first time. Thus, image reading of a front side of the document MS is started at a timing when the leading edge of the document MS reaches the reading position on the first contact glass 154.

At the same time, the switching pawl 95 is rotated to the position indicated by the broken line in FIG. 4, and the pair of reverse rollers 96 is normally rotated (e.g., the lower reverse roller 96a is rotated in the clockwise direction in FIG. 4). In addition, upon the first detection of the leading edge of the document MS by the registration sensor 65, a clutch or the like is used not to operate the pickup roller 80 and the feed roller 81, thereby preventing feeding of the subsequent document MS. The document MS passing through the first contact glass 154 is conveyed from the discharge opening 94 to the switchback conveyance path S by the pair of discharge rollers 93. Thereafter, a timing to complete image reading is determined when the registration sensor 65 detects a trailing edge of the document MS for the first time. Thus, image reading of the front side of the document MS is completed at a timing when the trailing edge of the document MS passes the reading position on the first contact glass 154.

When T seconds has elapsed after the detection of the trailing edge of the document MS by the registration sensor 65 so that the trailing edge of the document MS has passed through the discharge opening 94, the switching pawl 95 is returned to the position indicated by the solid line in FIG. 4 and the pair of reverse rollers 96 is reversely rotated (e.g., the lower reverse roller 96a is rotated in the counterclockwise direction in FIG. 4) to guide the document MS to the reverse path U with the trailing edge of the document MS at the head (hereinafter referred to as the leading edge of the document MS). The document MS entering the reverse path U is conveyed to the conveyance path Q again. Then, the document MS is further conveyed by the pair of entrance rollers 89, and the leading edge of the document MS is detected by the registration sensor 65 for the second time when passing below the registration sensor 65.

Upon the second detection of the leading edge of the document MS, similar to the first detection, a timing to start image reading of the document MS is determined. Thus, image reading of a back side of the document MS is started at a timing when the leading edge of the document MS reaches the reading position on the first contact glass 154. At the same time, the switching pawl 95 is rotated to the position indicated by the broken line in FIG. 4 and the pair of reverse rollers 96 is normally rotated. In a state in which the trailing edge of the document MS has not yet passed through the pair of reverse rollers 96, the pair of entrance rollers 89 and the pair of reverse rollers 96 are rotated to convey the document MS in the opposite directions, respectively. In the ADF 51 according to the present illustrative embodiment, a torque limiter is provided on a shaft of each of the pair of reverse rollers 96 so that the pair of reverse rollers 96 is rotated in conformity with conveyance of the document MS conveyed by the pair of entrance rollers 89.

After the image on the back side of the document MS has been read, the document MS is conveyed to the switchback conveyance path S by the pair of discharge rollers 93. Thereafter, the trailing edge of the document MS is detected by the registration sensor 65 for the second time.

The document MS is then conveyed back to the conveyance path Q again via the reverse path U and passes the first contact glass 154 with the front side thereof facing down. At this time, the image on the front side of the document MS is not read. In addition, when the registration sensor 65 detects the leading edge of the document MS for the third time, the switching pawl 95 is kept at the position indicated by the solid line in FIG. 4 so that the document MS is discharged from the discharge opening 94 and stacked on the discharge tray 55 with the front side thereof facing down. Upon the third detection of the trailing edge of the document MS by the registration sensor 65, the subsequent document MS is fed from the document tray 53 when the document sensor 57 detects presence of the documents MS on the document tray 53, and the above-described series of duplex image reading is performed. By contrast, when no document MS is detected by the document sensor 57, the series of duplex image reading is completed.

The ADF 51 further includes a pre-separation unit 130 disposed between the pickup roller 80 and the separation nip N. The pre-separation unit 130 includes a guide member that guides the documents MS to the separation nip N. The guide member has a sloped upper surface sloping upward from upstream to downstream in the conveyance direction of the documents MS that applies resistance to the documents MS passing over the sloped surface. Accordingly, only the topmost document MS, to which a conveyance force is directly applied by the pickup roller 80, is conveyed to the separation nip N against the resistance applied by the sloped portion of the pre-separation unit 130. By contrast, the second and subsequent documents MS are separated from the topmost document MS by the resistance applied by the sloped portion of the pre-separation unit 130.

To further facilitate an understanding of the unique features of the present invention, a description is now given of a pre-separation unit 13 of a related-art ADF 510 with reference to FIGS. 6 to 9. It is to be noted that, for ease of comparison, the same reference numerals are used in both the present illustrative embodiment and the related art for those components having the same function even when they have slightly different shapes.

Figure 6:
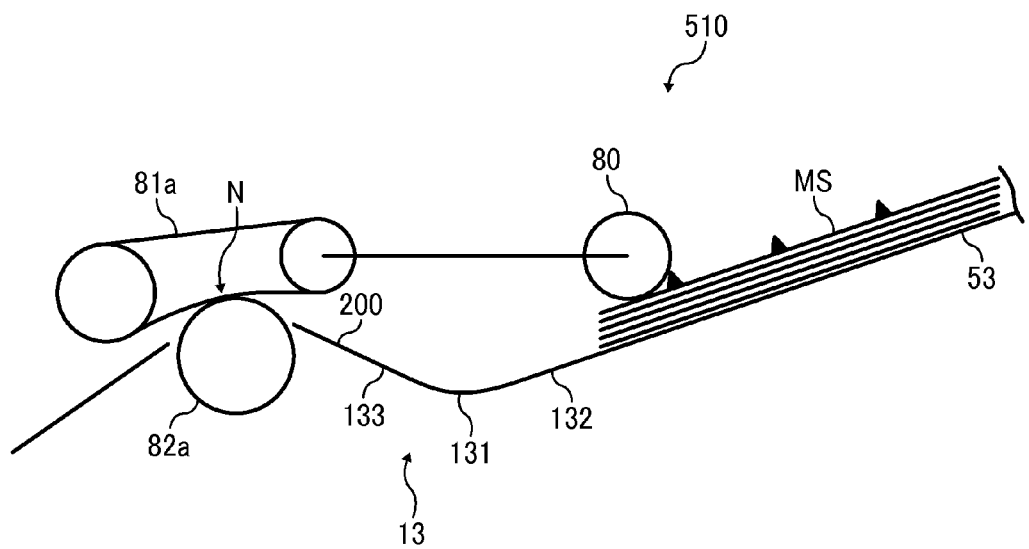
FIG. 6 is a vertical cross-sectional view illustrating a first example of a configuration of a related-art ADF in a state in which a stack of documents is set on a document tray.
Figure 7:
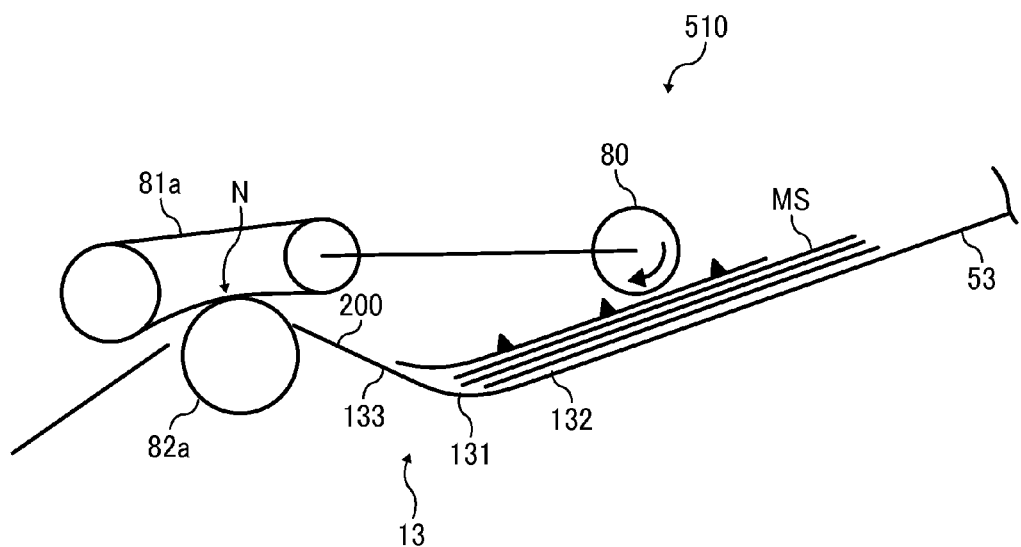
FIG. 7 is a vertical cross-sectional view illustrating the configuration of the related-art ADF illustrated in FIG. 6 in a state in which a topmost document is separated from the rest of the stack of documents by a pre-separation unit.

FIG. 6 is a vertical cross-sectional view illustrating a first example of a configuration of the related-art ADF 510 at a portion between the document tray 53 and the separation nip N in a state in which the documents MS are set on the document tray 53. FIG. 7 is a vertical cross-sectional view illustrating the configuration of the related-art ADF 510 illustrated in FIG. 6 in a state in which the topmost document MS is separated from the rest of the stack of documents MS by the pre-separation unit 13.

In the first example, a feed belt 81a is used as a separation conveyance member and a reverse roller 82a is used as a separation member in the related-art ADF 510. The pre-separation unit 13 of the related-art ADF 510 includes a separation guide plate 200 that guides the documents MS from the document tray 53 to the separation nip N. A recessed portion 131, a downward sloped portion 132, and a resistance sloped portion 133 sloping upward form the upper surface of the separation guide plate 200. The pre-separation unit 13 changes the conveyance direction of the leading edge of the document MS diagonally upward with its simple configuration.

In a case in which three or more sheets of the documents MS are fed together by the pickup roller 80 so that leading edges of those documents MS are aligned and superimposed one atop the other and reach the separation nip N at the same time, although acting on the bottommost document MS, a force applied by the separation member, that is, the reverse roller 82a, to separate the topmost document MS from the rest of the documents MS does not act on the documents MS positioned between the topmost and bottommost documents MS, thereby causing multiple feeding of the documents MS.

In the related-art ADF 510, the stack of documents MS is set on the document tray 53 such that the leading edges of the documents MS face diagonally downward. When the multiple documents MS are fed together by the pickup roller 80, the leading edges of the multiple documents MS hit against the resistance sloped portion 133 of the separation guide plate 200. At this time, the leading edge of the topmost document MS is positioned downstream from the leading edges of the rest of the documents MS as illustrated in FIG. 7.

Thus, even in a case of multiple feeding of the documents MS, the documents MS are prevented from reaching the separation nip N with all the leading edges thereof aligned with one another in the conveyance direction of the documents MS. In addition, when the leading edge of the topmost document MS positioned downstream from the rest of the documents MS reaches the separation nip N, the leading edges of the rest of the documents MS do not reach the separation nip N yet. Accordingly, a conveyance force from the separation conveyance member such as the feed belt 81a can act only on the topmost document MS. Thereafter, when reaching the separation nip N, the leading edges of the rest of the documents MS are not aligned with one another. As a result, the force from the separation member can act also on the documents MS positioned between the topmost and bottommost documents MS. Thus, even in the case of multiple feeding of the documents MS from the document tray 53, the multiple documents MS are easily separated from one another at the separation nip N, thereby achieving reliable separation of the documents MS sheet by sheet.

Figure 8:
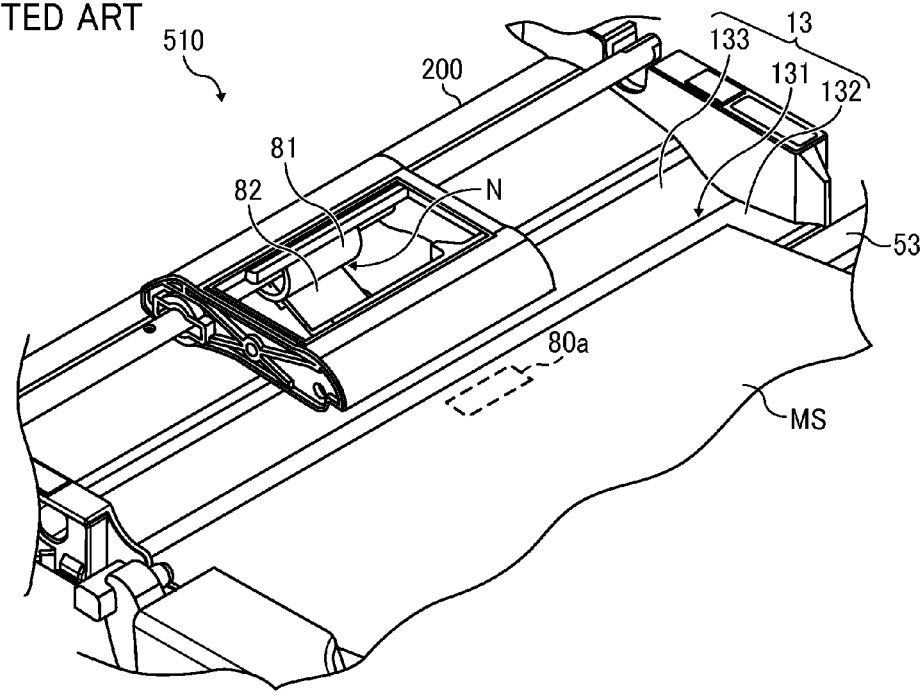
FIG. 8 is a partial perspective view illustrating a second example of a configuration of the related-art ADF in the state in which the stack of documents is set on the document tray.
Figure 9:
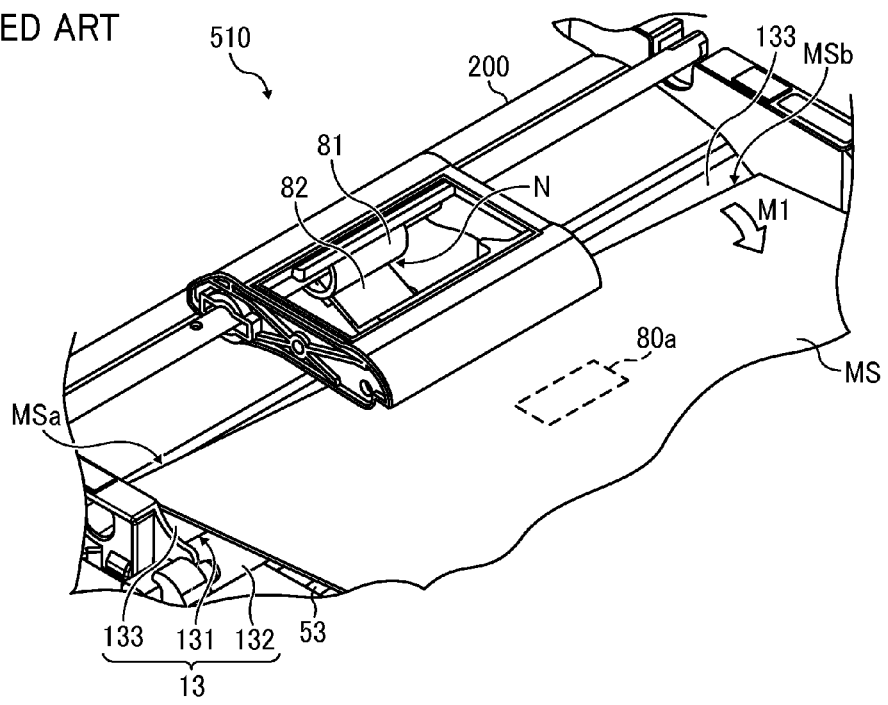
FIG. 9 is a partial perspective view illustrating the configuration of the related-art ADF illustrated in FIG. 8 in a state in which a skewed document passes over the pre-separation unit.

FIG. 8 is a partial perspective view illustrating a second example of a configuration of the related-art ADF 510 at the portion between the document tray 53 and the separation nip N in the state in which the documents MS are set on the document tray 53. FIG. 9 is a partial perspective view illustrating the configuration of the related-art ADF 510 illustrated in FIG. 8 in a state in which a skewed document MS passes over the pre-separation unit 13. In place of the feed belt 81a and the reverse roller 82a, the feed roller 81 and the separation pad 82 are used as the separation conveyance member and the separation member in the second example, respectively. As illustrated in FIG. 8, the separation guide plate 200 of the pre-separation unit 13 is shaped to have the same cross-section along the lateral direction thereof in the related-art ADF 510. It is to be noted that, in FIGS. 8 and 9, reference numeral 80a denotes a portion contacted by the pickup roller 80 (hereinafter referred to as pickup contact portion 80a).

The sloped shape of the pre-separation unit 13 facilitates separation of the multiple documents MS one by one particularly in a case in which the separation member such as the separation pad 82 that prevents conveyance of the documents MS other than the topmost document MS does not have a function to push the documents MS backward.

However, when the pre-separation unit 13 has the same cross-section along the lateral direction thereof as in the case of the related-art ADF 510, a skew of the document MS may be increased while the document MS is passing over the pre-separation unit 13 for the following reason.

The documents MS are fed from the document tray 53 only by the force of the pickup roller 80 until the leading edges of the documents MS enter the separation nip N. However, the pickup roller 80 feeds the documents MS from the document tray 53 with extremely small force in order to prevent multiple feeding of the documents MS. In other words, the documents MS are conveyed in an extremely unstable state until the leading edges of the documents MS reach the separation nip N. In such a state, an external force suddenly applied to the documents MS can skew the documents MS.

When the documents MS skewed by the sudden external force or irregular setting of the documents MS on the document tray 53 pass the pre-separation unit 130, a right leading corner MSb of each document MS may remain on the resistance sloped portion 133 after a left leading corner MSa thereof has passed over the resistance sloped portion 133 as illustrated in FIG. 9. At this time, only the right leading corner MSb of the document MS receives the resistance from the resistance sloped portion 133, thereby generating a torque M1 that rotates the document MS in the clockwise direction in FIG. 9 around the pickup contact portion 80a. Because of the small conveyance force of the pickup roller 80, the torque M1 caused by the resistance from the resistance sloped portion 133 rotates the document MS, resulting in an increase in the skew of the document MS. Thus, as described above, the configuration of the related-art pre-separation unit 13 increases the skew of the document MS which is skewed when fed from the document tray 53.

It is conceivable that the force of the pickup roller 80 to feed the documents MS from the document tray 53 is increased to prevent the skew of the documents MS. However, the increased conveyance force of the pickup roller 80 may increase the number of documents MS fed together at the same time from the document tray 53 to the separation nip N for the following reason.

When contact pressure of the pickup roller 80 against the documents MS is increased in order to increase the conveyance force of the pickup roller 80, contact pressure between each document MS is also increased, thereby increasing a frictional force between each document MS. Accordingly, the second and subsequent documents MS tend to move together with the topmost document MS, to which the conveyance force is directly applied by the pickup roller 80, in the conveyance direction of the documents MS. As a result, the increased number of documents MS are fed together from the document tray 53 by the pickup roller 80. Therefore, separation performance of the pre-separation unit 13 at the separation nip N must be further improved if the conveyance force of the pickup roller 80 is increased.

A description is now given of the pre-separation unit 130 of the ADF 51 according to the present illustrative embodiment with reference to FIGS. 10 to 15.

Figure 10:
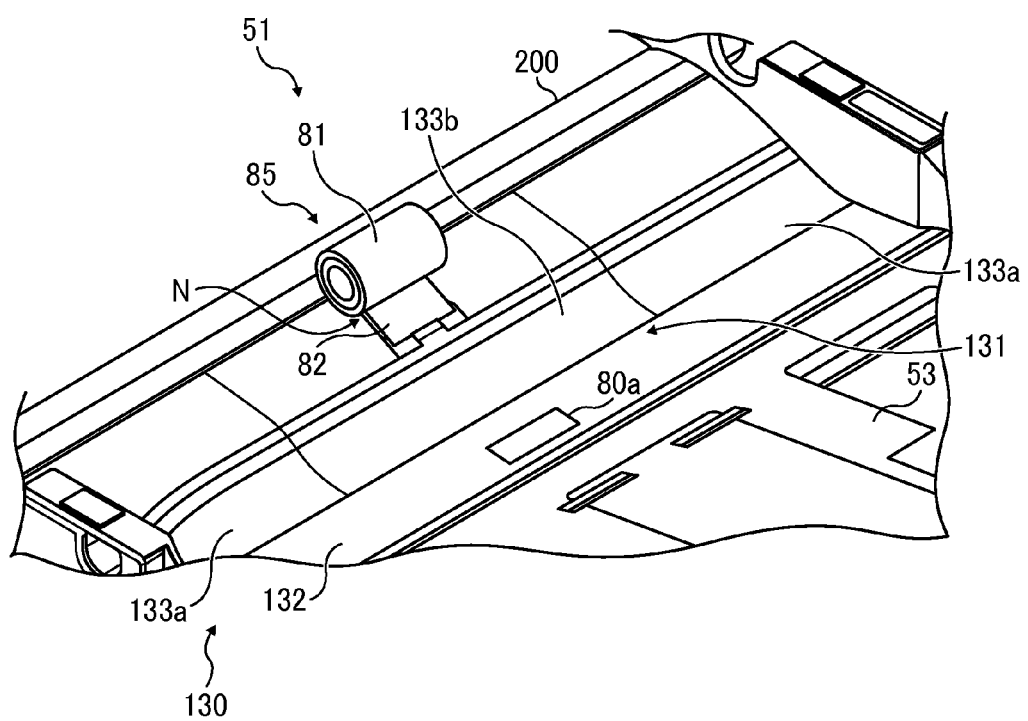
FIG. 10 is a partial perspective view illustrating an example of a configuration of a separation guide plate of a pre-separation unit provided to the ADF according to the illustrative embodiment.
Figure 11:
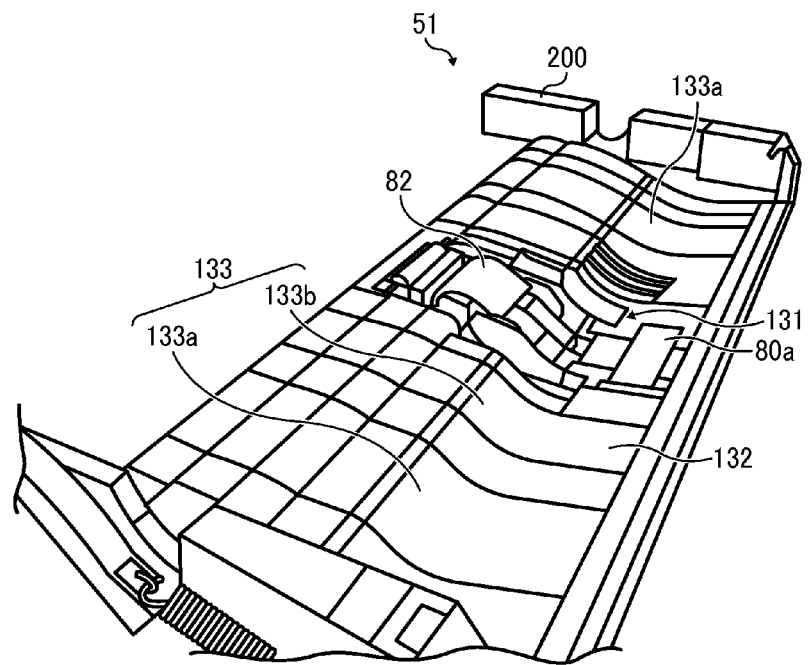
FIG. 11 is a perspective view of the separation guide plate viewed from an angle different from that of FIG. 10.
Figure 12:
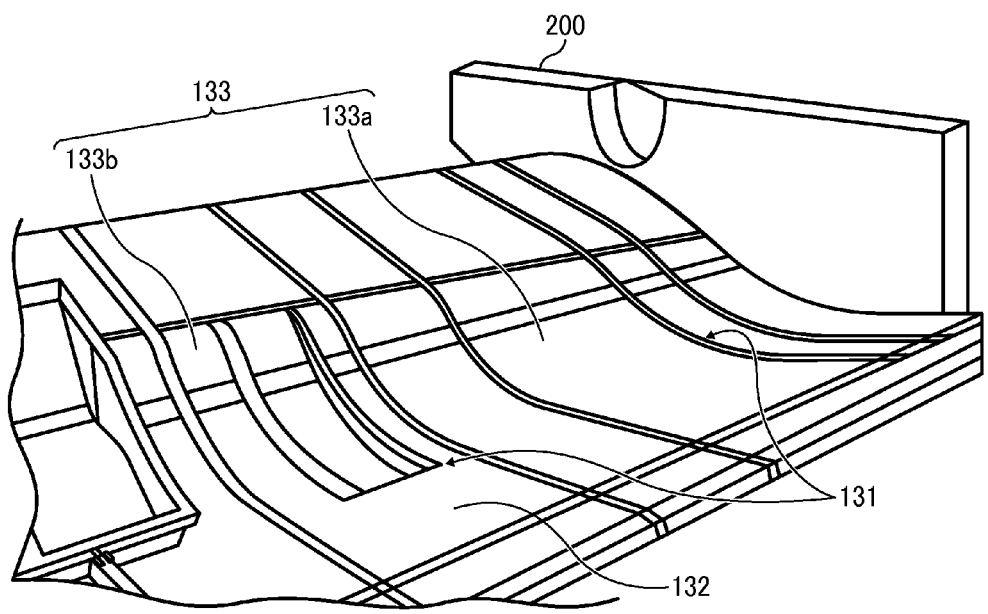
FIG. 12 is an enlarged perspective view illustrating a configuration of a lateral end of the separation guide plate.
Figure 13A:
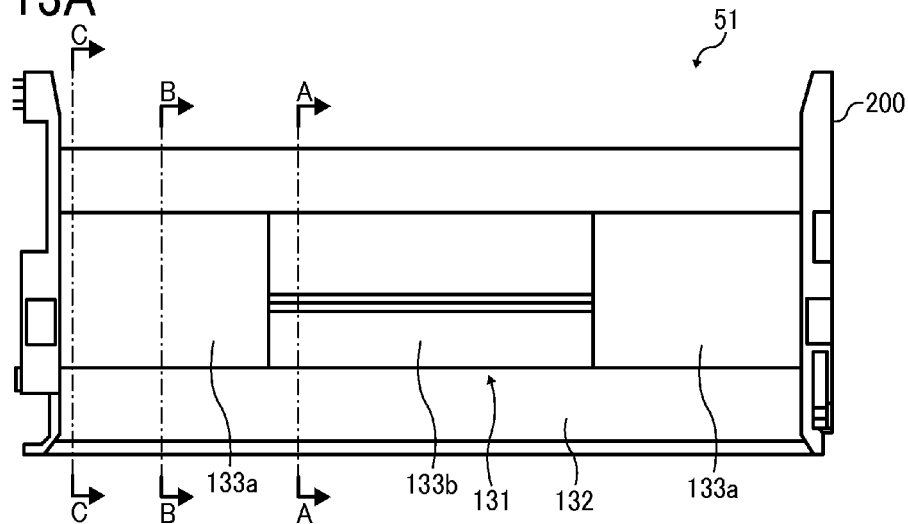
FIG. 13A is a top view of the separation guide plate.
Figure 13B:
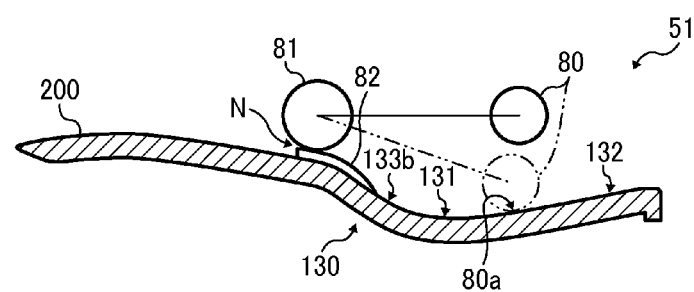
FIG. 13B is a vertical cross-sectional view taken along a line A-A in FIG. 13A.
Figure 13C:
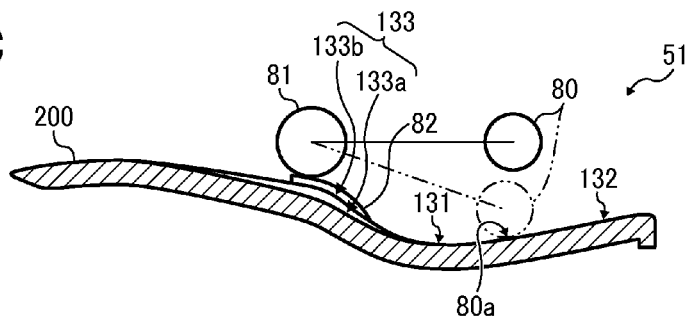
FIG. 13C is a vertical cross-sectional view taken along a line B-B in FIG. 13A.
Figure 13D:
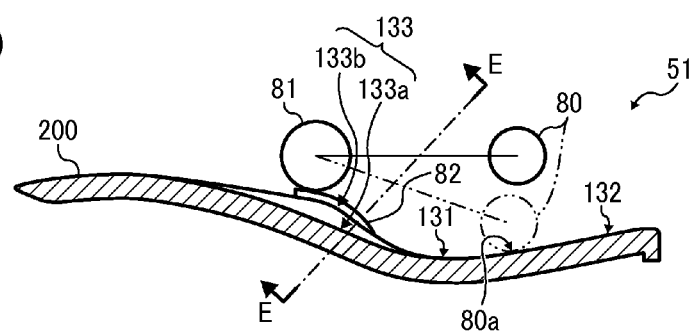
FIG. 13D is a vertical cross-sectional view taken along a line C-C in FIG. 13A.
Figure 14:
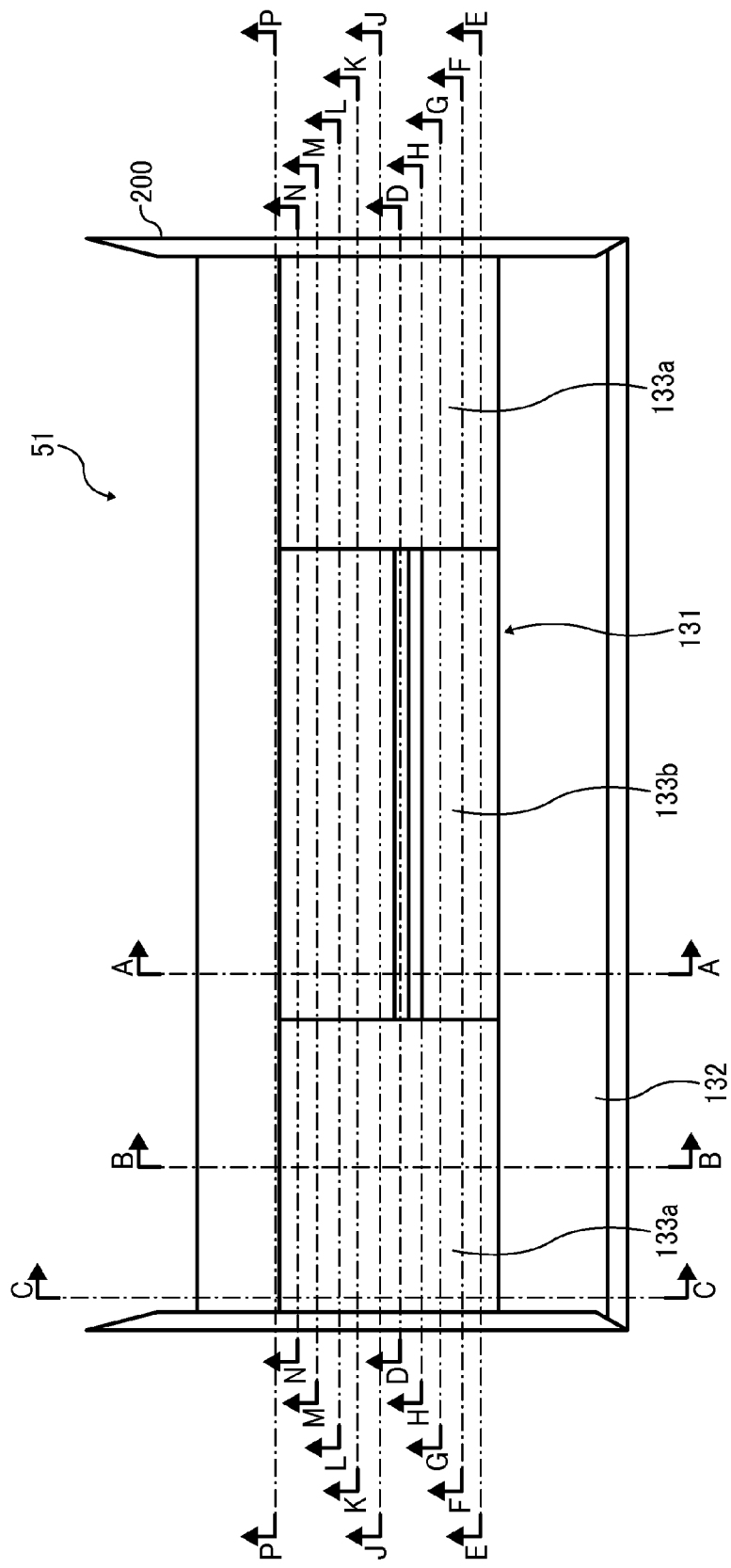
FIG. 14 is a schematic plan view of the separation guide plate.
Figure 15:
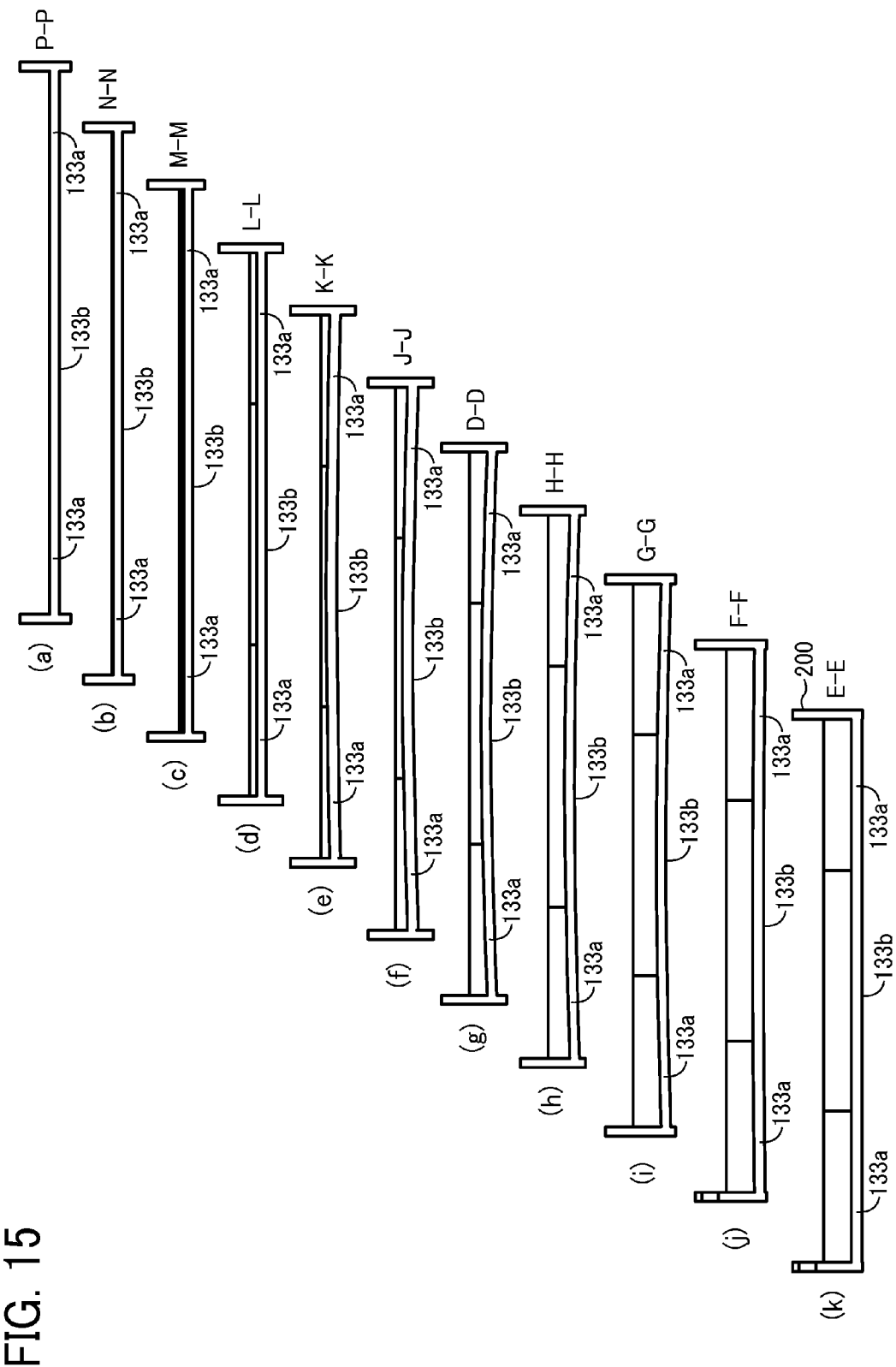
FIGS. 15(*a*) to 15(*k*) are vertical cross-sectional views taken along lines P-P, N-N, M-M, L-L, K-K, J-J, D-D, H-H, G-G, F-F, and E-E in FIG. 14, respectively.

FIG. 10 is a partial perspective view illustrating an example of a configuration of a separation guide plate 200 provided to the ADF 51 according to the present illustrative embodiment. FIG. 11 is a perspective view of the separation guide plate 200 viewed from an angle different from that of FIG. 10. FIG. 12 is an enlarged perspective view illustrating a configuration of a lateral end of the separation guide plate 200. FIG. 13A is a top view of the separation guide plate 200. FIG. 13B is a vertical cross-sectional view taken along a line A-A in FIG. 13A. FIG. 13C is a vertical cross-sectional view taken along a line B-B in FIG. 13A. FIG. 13D is a vertical cross-sectional view taken along a line C-C in FIG. 13A. FIG. 14 is a schematic plan view of the separation guide plate 200. FIGS. 15(a) to 15(k) are vertical cross-sectional views taken along lines P-P, N-N, M-M, L-L, K-K, J-J, D-D, H-H, G-G, F-F, and E-E in FIG. 14, respectively.

In the ADF 51 according to the present illustrative embodiment, the pre-separation unit 130 is provided downstream from the pickup contact portion 80a, at which the documents MS are contacted and picked up by the pickup roller 80, and upstream from the separation nip N in the conveyance direction of the documents MS. The feed roller 81 and the separation pad 82 are disposed at the center of the ADF 51 in the lateral direction.

An upward sloped portion, which, in the present illustrative embodiment, is a resistance sloped portion 133, is constructed of side resistance sloped portions 133a and a central resistance sloped portion 133b sandwiched by the side resistance sloped portions 133a. The resistance sloped portion 133 is formed on an upper surface of the separation guide plate 200 in the pre-separation unit 130. The central resistance sloped portion 133b formed at the center of the separation guide plate 200 in the lateral direction has the same sloped shape as the resistance sloped portion 133 of the related-art pre-separation unit 13. However, unlike the related-art pre-separation unit 13 in which the resistance sloped portion 133 is sloped at the same angle along the lateral direction thereof, the side resistance sloped portions 133a formed at both ends of the separation guide plate 200 in the lateral direction are sloped upward more gently than the central resistance sloped portion 133b toward the ends of the separation guide plate 200 in the lateral direction as illustrated in FIGS. 13C and 13D. Accordingly, the torque that acts on the document MS is reduced. In the separation guide plate 200 having the above-described configuration, it is the central resistance sloped portion 133b formed at the center of the separation guide plate 200 that mainly performs pre-separation of the documents MS fed from the document tray 53.

In a case in which the document MS fed from the document tray 53 is skewed and only one of the left and right corners at the leading edge of the document MS remains on the pre-separation unit 130, that corner at the leading edge of the document MS is positioned on the side resistance sloped portion 133a, which is sloped upward more gently than the central resistance sloped portion 133b. Accordingly, the pre-separation unit 130 of the present illustrative embodiment can suppress the resistance acting on the corner at the leading edge of the document MS. As a result, the torque that rotates the corner of the document MS remaining on the pre-separation unit 130 toward an upstream side of the conveyance direction of the document MS around the pickup contact portion 80a is suppressed, thereby preventing an increase in the skew of the document MS.

It is to be noted that if the central resistance sloped portion 133b and the side resistance sloped portions 133a do not form a single continuous surface and there is a step in the resistance sloped portion 133, lateral edges of a narrow document MS or the leading edge of the document MS may be caught by the step, resulting in irregular conveyance of the document MS. By contrast, in the separation guide plate 200 of the pre-separation unit 130 according to the present illustrative embodiment, the central resistance sloped portion 133b and the side resistance sloped portions 133a are continuous with each other and are sloped upward more gently toward the edges of the separation guide plate 200 in the lateral direction, thereby preventing irregular conveyance of the document MS caused by the step.

As a result, even in a case in which a wide document MS, which is skewed, enters the pre-separation unit 130, the corners at the leading edge of the document MS do not hit against the side resistance sloped portions 133a. Accordingly, the torque acting on the document MS can be reduced, thereby preventing the increase in the skew of the document MS at the pre-separation unit 130. In addition, the central resistance sloped portion 133b of the pre-separation unit 130 is sloped upward at the same angle as the resistance sloped portion 133 of the related-art pre-separation unit 13, thereby still achieving good pre-separation performance.

As illustrated in FIG. 15(g) that shows the vertical cross-section of the separation guide plate 200 along the line D-D in FIG. 14, the separation guide plate 200 is curved such that the center is higher than the lateral ends. Accordingly, the document MS passing over the separation guide plate 200 is bent such that the center of the document MS is higher than the lateral edges thereof. As a result, the document MS acquires a certain stiffness, thereby achieving stable conveyance of the document MS. Further, the angle of each of the side resistance sloped portions 133a is gradually changed such that the side resistance sloped portions 133a are sloped upward more gently toward the ends of the separation guide plate 200 in the lateral direction, respectively. As a result, both wide and narrow documents MS can be bent at a certain curvature in the lateral direction.

The separation guide plate 200 further has a downward sloped portion 132 provided upstream from the central and side resistance sloped portions 133b and 133a, and a recessed portion 131 formed between the downward sloped portion 132 and the central and side resistance sloped portions 133b and 133a in the conveyance direction of the documents MS. The documents MS conveyed diagonally downward in conformity with the shape of the downward sloped portion 132 hit against the central and side resistance sloped portions 133b and 133a, each of which is sloped upward relative to a horizontal direction, thereby prompting separation of the documents MS sheet by sheet. However, the central and side resistance sloped portions 133b and 133a need not be sloped upward, respectively, as long as an angle between a pre-separation guide surface, which is formed immediately in front of the central and side resistance sloped portions 133b and 133a such as the downward sloped portion 132, and the central and side resistance sloped portions 133b and 133a is set less than 180° so that the document MS, which is conveyed in conformity with the shape of the pre-separation guide surface due to its stiffness, hits against the central and side resistance sloped portions 133b and 133a.

For example, in the case of a configuration in which the central and side resistance sloped portions 133b and 133a are horizontally formed or are sloped downward, the pre-separation unit 130 can still achieve good pre-separation performance as long as the central and side resistance sloped portions 133b and 133a are angled relative to the pre-separation guide surface so that the document MS hits against the central and side resistance sloped portions 133b and 133a.

Further, in a case in which the configuration of the separation guide plate 200 illustrated in FIGS. 13B to 13D is reversed upside down, a guide member that supports the document MS from below immediately before the document MS reaches the boundary between the pre-separation guide surface and the central and side resistance sloped portions 133b and 133a may be provided to convey the document MS along the pre-separation guide surface so that the leading edge of the document MS hits against the central and side resistance sloped portions 133b and 133a.

The image reading device 50 including the ADF 51 according to the foregoing illustrative embodiment can securely feed the documents MS sheet by sheet without an increase in the skew of the documents MS, thereby achieving secure image reading of the documents MS. Further, the image forming apparatus 500 including the image reading device 50 according to the foregoing illustrative embodiment can reliably form higher-quality images based on image data read by the image reading device 50.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the scope of the present invention, and all such modifications as would be obvious to one skilled in the art are intended to be included within the scope of the following claims.

The number of constituent elements and their locations, shapes, and so forth are not limited to any of the structure for performing the methodology illustrated in the drawings.

What is claimed is:
1. A sheet conveyance unit, comprising:
a sheet tray on which a stack of sheets is placed;
a sheet feed member to feed sheets from the stack of sheets placed on the sheet tray;
a separation/feed unit to separate a topmost sheet from the rest of sheets fed by the sheet feed member and feed the topmost sheet to a predetermined position; and
a pre-separation unit disposed between the sheet tray and the separation/feed unit,
the pre-separation unit comprising:
a downward sloped portion to guide a leading edge of each sheet fed by the sheet feed member diagonally downward; and
an upward sloped portion continuous with the downward sloped portion and provided downstream from the downward sloped portion in a conveyance direction of the sheets to guide the leading edge of each sheet diagonally upward, both ends of the upward sloped portion in a lateral direction perpendicular to the conveyance direction of the sheets being sloped upward more gently than the center of the upward sloped portion in the lateral direction.

2. The sheet conveyance unit according to claim 1, wherein the upward sloped portion of the pre-separation unit forms a single continuous surface.

3. The sheet conveyance unit according to claim 1, wherein the separation/feed unit comprises:
a feed roller; and
a separation pad between the feed roller and the upward sloped surface to prevent conveyance of the rest of sheets other than the topmost sheet.

4. An image reading device, comprising:
a sheet conveyance unit to convey sheets of documents; and
a reading unit to read images on the documents conveyed by the sheet conveyance unit, the sheet conveyance unit comprising:
- a sheet tray on which a stack of sheets is placed;
- a sheet feed member to feed sheets from the stack of sheets placed on the sheet tray;
- a separation/feed unit to separate a topmost sheet from the rest of sheets fed by the sheet feed member and feed the topmost sheet to a predetermined position; and
- a pre-separation unit disposed between the sheet tray and the separation/feed unit, the pre-separation unit comprising:
- a downward sloped portion to guide a leading edge of each sheet fed by the sheet feed member diagonally downward; and
- an upward sloped portion continuous with the downward sloped portion and provided downstream from the downward sloped portion in a conveyance direction of the sheets to guide the leading edge of each sheet diagonally upward, both ends of the upward sloped portion in a lateral direction perpendicular to the conveyance direction of the sheets being sloped upward more gently than the center of the upward sloped portion in the lateral direction.

5. An image forming apparatus, comprising:
an image reading device; and
an image forming unit to form an image based on image data read by the image reading device,
the image reading device comprising:
- a sheet conveyance unit to convey sheets of documents; and
- a reading unit to read images on the documents conveyed by the sheet conveyance unit, the sheet conveyance unit comprising:
- a sheet tray on which a stack of sheets is placed;
- a sheet feed member to feed sheets from the stack of sheets placed on the sheet tray;
- a separation/feed unit to separate a topmost sheet from the rest of sheets fed by the sheet feed member and feed the topmost sheet to a predetermined position; and
- a pre-separation unit disposed between the sheet tray and the separation/feed unit, the pre-separation unit comprising:
- a downward sloped portion to guide a leading edge of each sheet fed by the sheet feed member diagonally downward; and
- an upward sloped portion continuous with the downward sloped portion and provided downstream from the downward sloped portion in a conveyance direction of the sheets to guide the leading edge of each sheet diagonally upward, both ends of the upward sloped portion in a lateral direction perpendicular to the conveyance direction of the sheets being sloped upward more gently than the center of the upward sloped portion in the lateral direction.

6. The sheet conveyance unit according to claim 1, wherein the downward sloped portion and the upward sloped portion of the pre-separation unit form a separation guide plate and the upward sloped portion has a central resistance sloped portion that is a sheet contact surface centered on the guide plate and sandwiched by two lateral side resistance portions, the guide plate having a sheet contact surface that slopes downward in the lateral direction from the central resistance portion toward the two side resistance portions.

7. The image reading device according to claim 4, wherein the downward sloped portion and the upward sloped portion of the pre-separation unit form a separation guide plate and the upward sloped portion has a central resistance sloped portion that is a sheet contact surface centered on the guide plate and sandwiched by two lateral side resistance portions, the guide plate sloping having a sheet contact surface that slopes downward in the lateral direction from the central resistance portion toward the two side resistance portions.

8. The image forming apparatus according to claim 5, wherein the downward sloped portion and the upward sloped portion of the pre-separation unit form a separation guide plate and the upward sloped portion has a central resistance sloped portion that is a sheet contact surface centered on the guide plate and sandwiched by two lateral side resistance portions, the guide plate having a sheet contact surface that slopes downward in the lateral direction from the central resistance portion toward the two side resistance portions.

* * * * *